United States Patent [19]

Bacardit

[11] Patent Number: 4,503,753
[45] Date of Patent: Mar. 12, 1985

[54] HYDRAULIC POWER-ASSISTANCE ACTUATING MECHANISMS, ESPECIALLY FOR SERVO-ASSISTED STEERING SYSTEMS

[75] Inventor: Juan S. Bacardit, Barcelona, Spain

[73] Assignee: Bendiberica S.A., Barcelona, Spain

[21] Appl. No.: 419,266

[22] Filed: Sep. 17, 1982

[30] Foreign Application Priority Data

Sep. 23, 1981 [ES] Spain .......................... 506438

[51] Int. Cl.³ .......................... B62D 5/10; B62D 5/06
[52] U.S. Cl. .............................. 91/375 R; 91/376 A; 180/132; 180/148
[58] Field of Search .......... 91/375 R, 376 A; 180/132, 148

[56] References Cited

U.S. PATENT DOCUMENTS 3,589,129  6/1971  Pollman ............... 91/375 R X
4,217,932  8/1980  Bacardit ............... 180/132 X
4,381,905  5/1983  Petersen ............... 91/375 R X

FOREIGN PATENT DOCUMENTS 0075518  3/1983  European Pat. Off. ............ 180/132
0159760  3/1979  Netherlands ......................... 180/132

Primary Examiner—Sheldon J. Richter
Assistant Examiner—Randolph A. Smith
Attorney, Agent, or Firm—Larry J. Palguta; Ken C. Decker

[57] ABSTRACT

The actuating mechanism comprises a force step-up transmission with an output member (25) and an input member (17) connected to a control system via a hydraulic distributor (16), these input and output members being coaxial, the step-up transmission consisting of a coaxial train of epicyclic gears (32, 37, 38), and the double-acting power-assistance motor comprises a likewise coaxial rotor (9) with blades (10) which is connected to the output member (25) and which rotates in a cavity (7) formed by the box (4) of the mechanism.

9 Claims, 4 Drawing Figures

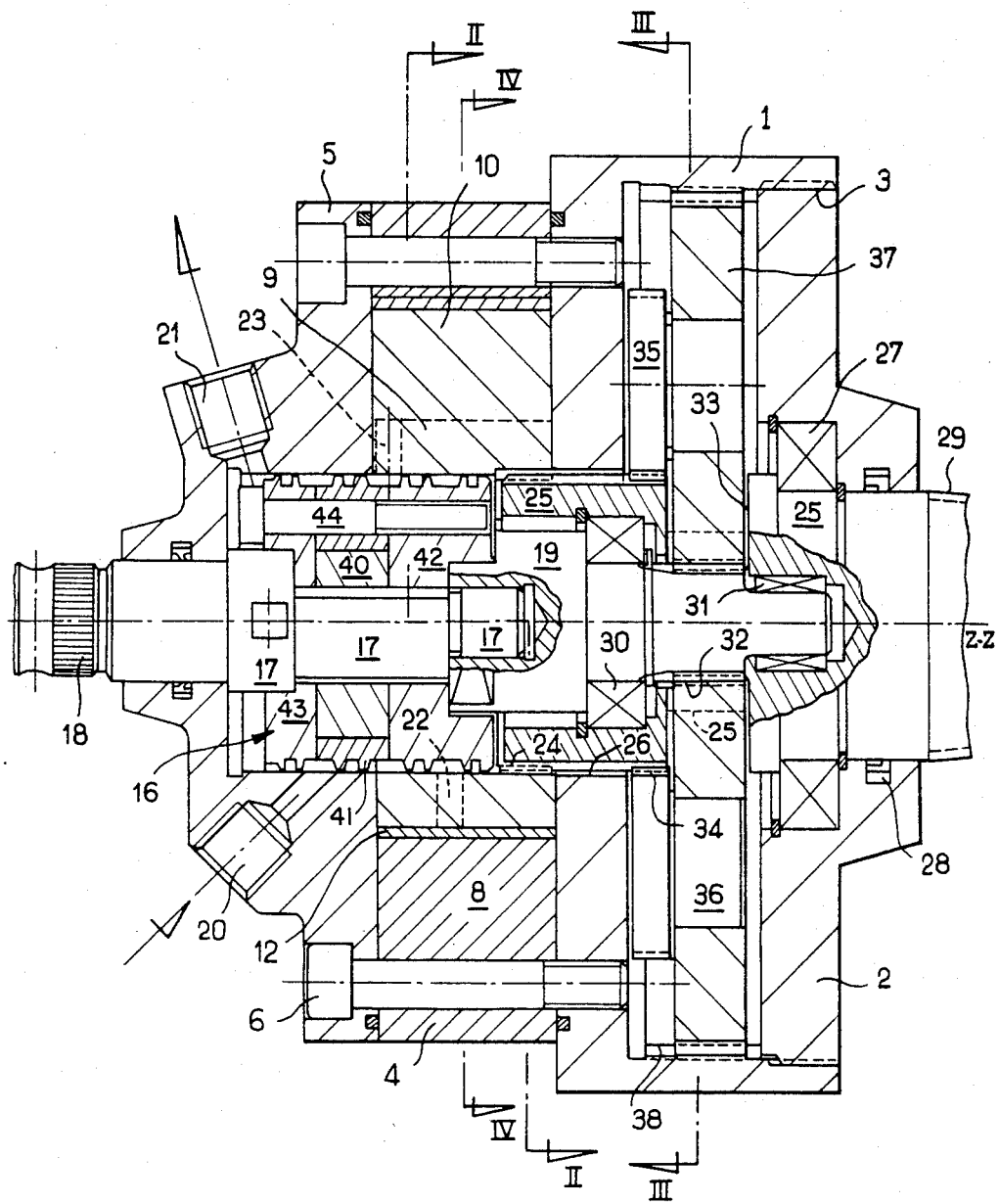
FIG_1

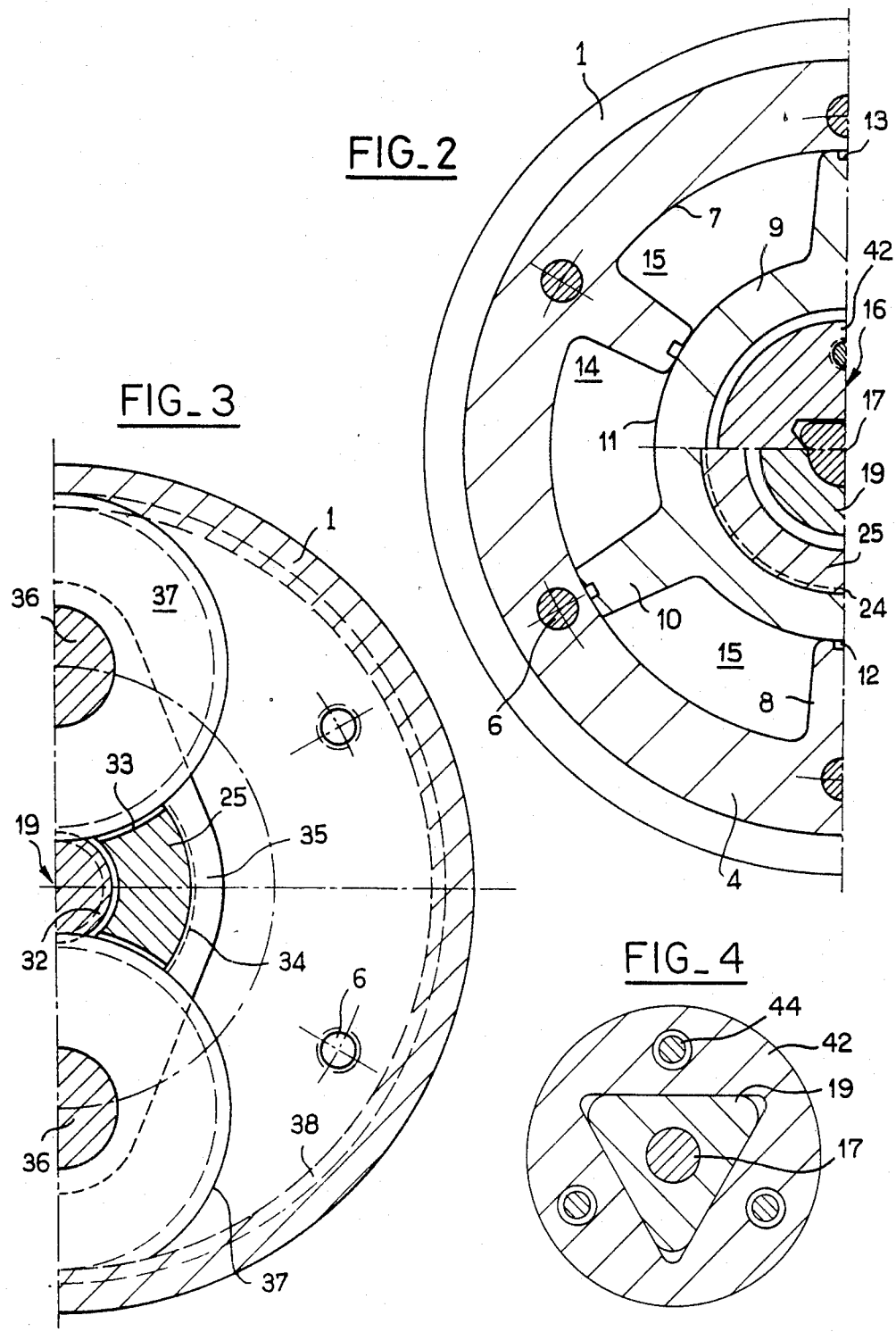

HYDRAULIC POWER-ASSISTANCE ACTUATING MECHANISMS, ESPECIALLY FOR SERVO-ASSISTED STEERING SYSTEMS

The present invention relates to hydraulic power-assistance actuating mechanisms, more particularly for servo-assisted steering systems of motor vehicles, of the type comprising a force step-up transmission having a rotary output member capable of being connected to a driven system to be actuated, typically a steering system, and a rotary input member capable of being connected to a system for controlling the application of the said force, typically a steering-wheel, by means of a lost-motion coupling and by means of a hydraulic distributor making use of this lost-motion to feed selectively the working chambers of at least one double-acting hydraulic power-assistance motor responsible for providing this power assistance.

The actuating mechanisms of this type can be used in various fields of mechanical construction, and reference is made herewith, purely by way of example, to the hydraulic power-assistance actuating mechanisms used in the power-assisted steering systems of motor vehicles.

The nature of the force step-up transmission is, as a rule, governed by the construction characteristics of the mechanical assembly in which this actuating mechanism in question is incorporated. Thus, for example, in servo-assisted steering systems for cars, this transmission can take the form of a screw-and-nut device connected to the rotary output member by means of a gear of any type, for example a rack-and-sector system, a pinion/-toothed-wheel assembly, a pinion/rack assembly or other similar devices, as described, for example, in U.S. Pat. No. 2,410,049. In all cases, the position and orientation of the rotary output member differ from those of the rotary input member which receives the actuation, as is appropriate in most cases, but there is, nevertheless, a demand for actuating mechanisms where the rotary output member is coaxial to the rotary input member, for example when it is intended to integrate a servo-mechanism of this type into a pre-existing non-power-assisted steering column of a motor vehicle.

The object of the present invention is specifically to fill this gap and to propose a hydraulic power-assistance actuating mechanism of the type described above, having an especially compact design with a rotary output member coaxial to the input member, and at the same time ensuring power assistance and stepping-up of the force.

For this purpose, according to a characteristic of the present invention, in an actuating mechanism of the type defined above, the rotary and output members of the mechanism are coaxial and the force step-up transmission consists of a likewise coaxial epicyclic gear train which includes a planet pinion fixed to the coaxial secondary member of the distributor and at least one satellite pinion carried by a transverse arm fixed to the output member, the double-acting motor comprising a likewise coaxial bladed rotor which is connected to the output member and which rotates in a cavity formed by the box of the mechanism.

By means of such an arrangement, according to the object of the invention, the essential parts of the elements of the mechanism, including the power-assistance motor, are arranged coaxial to the single main axis of rotation of the mechanism.

According to one aspect of the invention, the secondary member of the distributor extends in an axial recess in the output member or shaft of the mechanism, and the blade rotor of the motor is arranged so as to surround the distributor partially.

In this way, an especially compact axial bulk of the mechanism as a whole is achieved.

Other characteristics and advantages of the invention will appear from the following description of an embodiment given by way of illustration and in no way limiting, the description being made in relation to the attached drawings in which:

FIG. 1 is an axial section through an actuating mechanism according to the invention;

FIG. 2 is a half cross-section along the line II—II of FIG. 1;

FIG. 3 is a half cross-section along the line III—III of FIG. 1; and

FIG. 4 is a partial cross-section view along the line IV—IV of FIG. 1.

As may be seen in FIG. 1, the mechanism according to the invention comprises essentially a coaxial stack of a reduction-mechanism body 1, which takes the form of a dish closed by a cover 2 screwed at 3, and of an annular actuating-mechanism body 4 closed by a cover 5, both fastened to the body 1 by means of screws 6 passing through the body 4.

The annular body of the actuating mechanism 4 has an inner cylindrical surface 7 which is interrupted, in the example illustrated, by three partitions 8 extending radially inwards and longitudinally over the entire axial extension of the body so as to form therein three identical enclosures. Mounted so as to rotate within this body 4 is an actuating rotor 9 having the same axial extension and provided with three blades 10 extending radially outwards and having the same axial extension as the rotor, the latter having an outer peripheral cylindrical surface 11 between the blades 10. The inner edges of the partitions 8 and the outer edges of the blades 10 are provided respectively with gaskets 12 and 13 which respectively match the cylindrical surfaces 11 and 7 of the rotor 9 and of the body 4. On the other hand, the opposite axial faces of the rotor 9 and of the body 4 of the actuating mechanism fit hermetically in a way known per se, for example by means of static and sliding gaskets, on the opposite axial faces of the reducer body 1 and of the cover of the actuating mechanism 5 so as to form, between the movable blades 10 and the fixed partitions 8, two series of working chambers 14 and 15 isolated hermetically from one another.

The cover 5 and the rotor 9 are machined coaxially on the inside so as to form a continuous bore constituting a receptacle for the stator of a hydraulic distributor, denoted by the general reference numeral 16, which can consist of any type of known and compatible rotary hydraulic distributor, for example a distributor with a sleeve and a rotor having coaxial grooves, or as illustrated, a compact star-shaped distributor such as that described, for example, in U.S. Pat. No. 4,459,897 in the name of the Applicant, the content of which is assumed to be incorporated herein for reference purposes, and comprising in all cases, a primary or input member 17 projecting outwards from the cover 5 and serving as a coupling 18 receiving, for example, the transmission column coming from the steering-wheel of a vehicle, and a secondary or output member 19, both operatively connected to one another (See FIGS. 2 and 4) by means of a mechanical lost-motion coupling comprising a triangular central shaft of member 17 received in oversized triangular openings in end pieces 42 and 43, and a corresponding coupling between the distributor rotor 40 and a stator 41, such as illustrated in U.S. Pat. Nos. 4,310,024 and 4,217,932. Relative movement between these two members 17 and 19 is used to actuate the (tubular or star-shaped) rotor 40 of the distributor 16 in rotation relative to the distributor stator 41 operatively connected by end pieces 42, 43 and bolts 44 to the secondary member 19, in order to feed selectively and alternately working fluid under pressure, circulating between a fluid inlet 20 and a fluid outlet 21 of the distributor, to respective working chambers 14, 15 of the power-assistance motor 4 via distribution pipes shown diagrammatically at 22, 23 (FIG. 1).

The end of the rotor 9 of the motor opposite the cover 5 is connected in rotation by a shaped coupling 24 to the inner end of a shaft, denoted by the general reference numeral 25, which constitutes the rotary output member of the force step-up transmission consisting of the reduction assembly 1. The shaft 25 is introduced through an axial bore 26 made in the reduction mechanism body 1 and is mounted rotatably in the cover 2 by means of a bearing 27 and a retaining ring 28, the shaft 25 being extended beyond the cover 2 so as to form an end coupling member 29 capable of being connected, for example, to the steering linkage of a vehicle.

As may be seen in the drawings, the secondary member 19 of the hydraulic distributor 16 is extended in the direction opposite the primary member 17 within a coaxial cavity made in the inner end portion of the output shaft 25, in which it is rotatingly mounted by means of two bearings 30, 31, between which a sun pinion 32 formed by the secondary member 19 is arranged.

The rotary output shaft 25 is provided, straight above the sun pinion 32, with two radial sunken apertures or recesses 33 diametrically opposite one another and supports, near one of the transverse edges of these apertures (in this case, the inner edge), by means of a shaped coupling or teeth 34, a transverse crosspiece 35 consisting of two arms symmetrical in relation to the axis Z—Z of the whole mechanism. Each of these arms forms an axle 36 projecting parallel to the axis Z—Z, on which pivots freely a satellite pinion 37 engaging, on the one hand, internally on the sun pinion 32 and, on the other hand, externally on a toothed ring 38 formed on the inner peripheral surface of the body 1. Advantageously, the gears of the epicyclic train have straight-toothing.

It will be noted that all the members described, with the exception of the satellite pinions 37 (although these are arranged symmetrically), are coaxial to the axis Z—Z of the mechanism as a whole, and that the special arrangement of some elements within the others makes it possible to achieve a greatly reduced axial dimension, especially by using a star-shaped rotary distributor.

This actuating mechanism operates as follows:

Without fluid or hydraulic power assistance, the manual actuation received at 18 by the primary member 17 of the distributor 16 will be transmitted directly, by means of the above-mentioned inner lost-motion coupling, to the secondary member 19 of the distributor which will thereby cause the sun pinion 32 to rotate in the leak-proof cavity of the reduction assembly 1. The rotation of this pinion 32 causes the satellite pinions 37 to rotate about their axles 36 so as to cause them to describe the toothed ring 38 in such a way that the crosspiece 35 is driven to rotate and, together with the crosspiece 35, the output shaft 25 of the body 1. The hydraulic power-assistance mechanism 4, being inactive, will receive on its bladed rotor 9 the drive from the output shaft 25, and the blades 10 of this rotor 9 will move without any effect between the fixed partitions 8 of the annular body 4.

In contrast to this, normally, with hydraulic power assistance, that is to say when fluid under pressure arrives via the pipe 20 (returning to the tank via the pipe 21) the amount of lost-motion existing in the operative connection of primary member 17 and secondary member 19 of the distributor 16 ensures that the distributor 16 consequently connects the chambers 14 and 15 selectively to the pipes 20 and 21 so as to feed fluid under pressure to the chambers in order to establish a differential pressure between the chambers 14 and 15, the rotor 9 thereby being driven in the corresponding direction and actuating the output shaft 25 to which it is coupled. The crosspiece 35 coupled by teeth or shaped coupling 34 to the shaft 25 causes the satellite pinions 37 to rotate on the toothed ring 38 so as to communicate a stepped-up rotation to the sun pinion 32 which, by means of the secondary member 19 of the hydraulic distributor 16 to which it is coupled, displaces the stator 41 of the distributor 16 in order to seek a position of equilibrium according to the new angular position reached by the primary member 17 of the distribuor 16 as a result of the operation carried out on the distributor.

When the primary member 17 of the distributor 16 (forming the input member of the mechanism as a whole) returns to the initial position of rest, the same operations are repeated, but in the opposite direction.

When the primary member 17 is actuated manually in the opposite direction, operation symmetrical in all respects to that described above takes place.

We claim;

1. A hydraulic power-assistance actuating mechanism comprising: a casing housing a force step-up transmission having a rotary output member intended to be connected to a driven system to be actuated and a rotary input member intended to be connected to a driven system, a hydraulic distributor having a rotor member coupled for rotation with said input member and a stator member coupled for rotation with said output member, said rotor member and stator member being capable of a limited relative rotational displacement to selectively actuate at least one double-acting assistance hydraulic motor coupled to said output member, characterized in that said input and output members of the mechanism are coaxially aligned, and the force step-up transmission comprises a coaxial epicyclic gear train which includes a sun gear coupled for rotation with the stator member of the distributor and at least one planet gear carried by a transverse arm coupled to said output member, the double-acting assistance hydraulic motor comprising a bladed rotor coaxial with the input and output members and having radially extending blades, the bladed rotor coupled for rotation with said output member and sealingly and slidingly rotating in a cavity formed in the casing of said mechanism.

2. The mechanism according to claim 1, characterized in that the stator member of the distributor has an end part rotatingly received in an axial recess formed in the output member of the mechanism.

3. The mechanism according to claim 2, characterized in that the planet gear has an inner portion extending in a radial side aperture in the output member so as to engage with the sun gear formed on said end part of the stator member which extends in said axial recess.

4. The mechanism according to claim 1, characterized in that the distributor is mounted within the casing of the mechanism.

5. The mechanism according to claim 4, in which the stator member surrounds the rotor member, characterized in that the stator member is received partially in a coaxial central bore of the bladed rotor.

6. The mechanism according to claim 3, characterized in that the planet gear intermeshes with a peripheral toothed ring formed on the inner surface of the casing of the mechanism.

7. The mechanism according to claim 6, characterized in that the output member of the mechanism is rotatingly supported in a front cover of the casing.

8. The mechanism according to claim 1, characterized in that the cavity in which the bladed rotor rotates has stationary radial partitions interacting in leakproof contact engagement with a hub portion of the bladed rotor.

9. The mechanism according to claim 6, characterized in that gears of the epicyclic gear train have straight toothing.

* * * * *